(12) United States Patent
Huang et al.

(10) Patent No.: US 9,817,974 B1
(45) Date of Patent: Nov. 14, 2017

(54) ANTI-MALWARE PROGRAM WITH STALLING CODE DETECTION

(71) Applicant: Trend Micro Incorporated, Tokyo (JP)

(72) Inventors: Qiang Huang, Nanjing (CN); Hu Cao, Nanjing (CN); Kai Yu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 14/937,254

(22) Filed: Nov. 10, 2015

(51) Int. Cl.
*G06F 11/00* (2006.01)
*G06F 21/56* (2013.01)
*G06F 11/36* (2006.01)

(52) U.S. Cl.
CPC ........ *G06F 21/563* (2013.01); *G06F 11/3644* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 8,990,939 B2 | 3/2015 | Staniford et al. | |
| 9,071,638 B1 | 6/2015 | Aziz et al. | |
| 9,106,694 B2 | 8/2015 | Aziz et al. | |
| 9,159,035 B1 | 10/2015 | Ismael et al. | |
| 9,171,160 B2 | 10/2015 | Vincent et al. | |
| 2014/0380474 A1 | 12/2014 | Paithane et al. | |
| 2017/0090952 A1* | 3/2017 | Griesemer | G06F 11/36 |

OTHER PUBLICATIONS

Control flow graph—from Wikipedia, the free encyclopedia, 4 sheets [retrieved on Nov. 2, 2015], retrieved from the Internet: https://en.wikipedia.org/wiki/Control_flow_graph.

* cited by examiner

*Primary Examiner* — Christopher Brown
(74) *Attorney, Agent, or Firm* — Okamoto & Benedicto LLP

(57) ABSTRACT

Execution of a sample program being evaluated for malware is initiated and then suspended to set breakpoints on timing operations of the sample program. Execution of the sample program is suspended again when a breakpoint is hit, at which time a loop is identified in the sample program and evaluated for presence of stalling code. Execution flow of the sample program is changed to exit the loop when the loop is determined to include the stalling code.

13 Claims, 8 Drawing Sheets

```
Command Prompt - c:\Python27\python.exe e:\SRC\IceFramework\ice.py -s c:\ICE\S...
2015-10-30 13:53:55.115 DEBUG [CK2 ] DFS order [0x00405200:5] - [0x00405213:6]
2015-10-30 13:53:55.115 DEBUG [CK2 ] DFS order [0x00405208:7] - [0x00405213:6]
2015-10-30 13:53:55.115 INFO  [CK2 ] Found back edge [0x00405208:7] -> [0x004052
13:6]
2015-10-30 13:53:55.115 DEBUG Loop  [ 0x00405213 0x00405208 ] -> 2
2015-10-30 13:53:55.115 DEBUG [CK2 ] DFS order [0x00405213:6] - [0x00405225:8]
2015-10-30 13:53:55.115 DEBUG [CK2 ] DFS order [0x00405213:6] - [0x00405208:7]
2015-10-30 13:53:55.115 DEBUG [CK2 ] DFS order [0x00405226:3] - [0x00405237:4]
2015-10-30 13:53:55.115 DEBUG [CK2 ] DFS order [0x00405226:3] - [0x00405219d:1]
2015-10-30 13:53:55.131 INFO  [CK2 ] Found back edge [0x00405226:3] -> [0x004051
9d:1]
2015-10-30 13:53:55.131 DEBUG Loop  [ 0x0040519d 0x0040451dc 0x00405226 ] -> 3
2015-10-30 13:53:55.131 DEBUG [CK2 ] Loop check stalling code [0x004051a9] -> [
0x00405174]
2015-10-30 13:53:55.131 DEBUG [CK2 ] Loop check stalling code [0x004051a9] -> [
0x00405174]
2015-10-30 13:53:55.145 DEBUG [CK2 ] Loop check stalling code [0x004051a9] -> [
0x0040519d]
2015-10-30 13:53:55.145 INFO  [CK2 ] Potential stalling code [0x004051a4 call m
svcrt_dll_time block [0x0040519d]
2015-10-30 13:53:55.161 INFO  [CK2 ] Break stalling code by jumping to [0x0040
5237].
2015-10-30 13:53:55.161 DEBUG [CK2 ] set EIP as [0x00405237].
```

ANTI-MALWARE PROGRAM WITH STALLING CODE DETECTION

BACKGROUND OF THE INVENTION

1. Field of the Invention

The present invention relates generally to computer security, and more particularly but not exclusively to methods and systems for detecting stalling code.

2. Description of the Background Art

Malware may be detected using so-called dynamic analysis, which involves running and monitoring the behavior of the malware. The dynamic analysis is typically performed in a sandbox, such as a suitably-configured virtual machine. One problem with dynamic analysis is that the analysis is typically performed on a single execution path, making the analysis vulnerable to evasion techniques, such as stalling codes. A stalling code executes a relatively long loop that is designed to induce dynamic analysis platforms to time out. This prevents malware with stalling code from being evaluated properly in a sandbox and other dynamic analysis platforms.

SUMMARY

In one embodiment, execution of a sample program being evaluated for malware is initiated and then suspended to set breakpoints on timing operations of the sample program. Execution of the sample program is suspended again when a breakpoint is hit, at which time a loop is identified in the sample program and evaluated for presence of stalling code. Execution flow of the sample program is changed to exit the loop when the loop is determined to include the stalling code.

These and other features of the present invention will be readily apparent to persons of ordinary skill in the art upon reading the entirety of this disclosure, which includes the accompanying drawings and claims.

DESCRIPTION OF THE DRAWINGS

FIGS. 6-8 show example screen shots of an anti-malware program that evaluates the function of FIG. 2 for stalling code in accordance with an embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
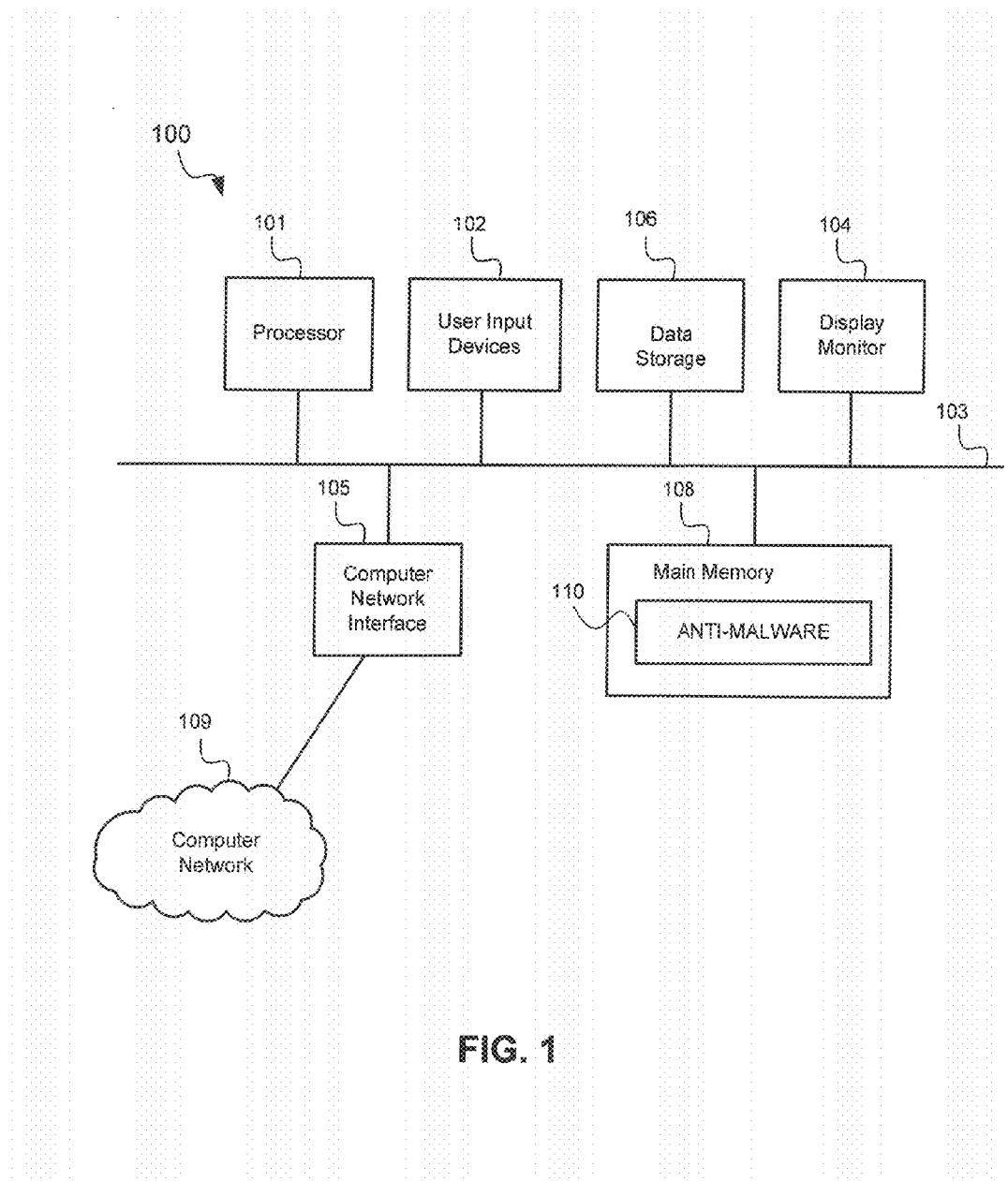
FIG. 1 shows a schematic diagram of a computer system in accordance with an embodiment of the present invention.

Referring now to FIG. 1, there is shown a schematic diagram of a computer system 100 in accordance with an embodiment of the present invention. The computer system 100 may be employed to evaluate a program for stalling code. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101. An article of manufacture may be embodied as computer-readable storage medium including instructions that when executed by the processor 101 of the computer system 100 causes the computer system 100 to be operable to perform the functions of the one or more software modules. In the example of FIG. 1, the software modules comprise an anti-malware program 110. The anti-malware program 110 may be configured to detect stalling code and allow program execution to be rectified to exit out of the stalling code.

Figure 2:
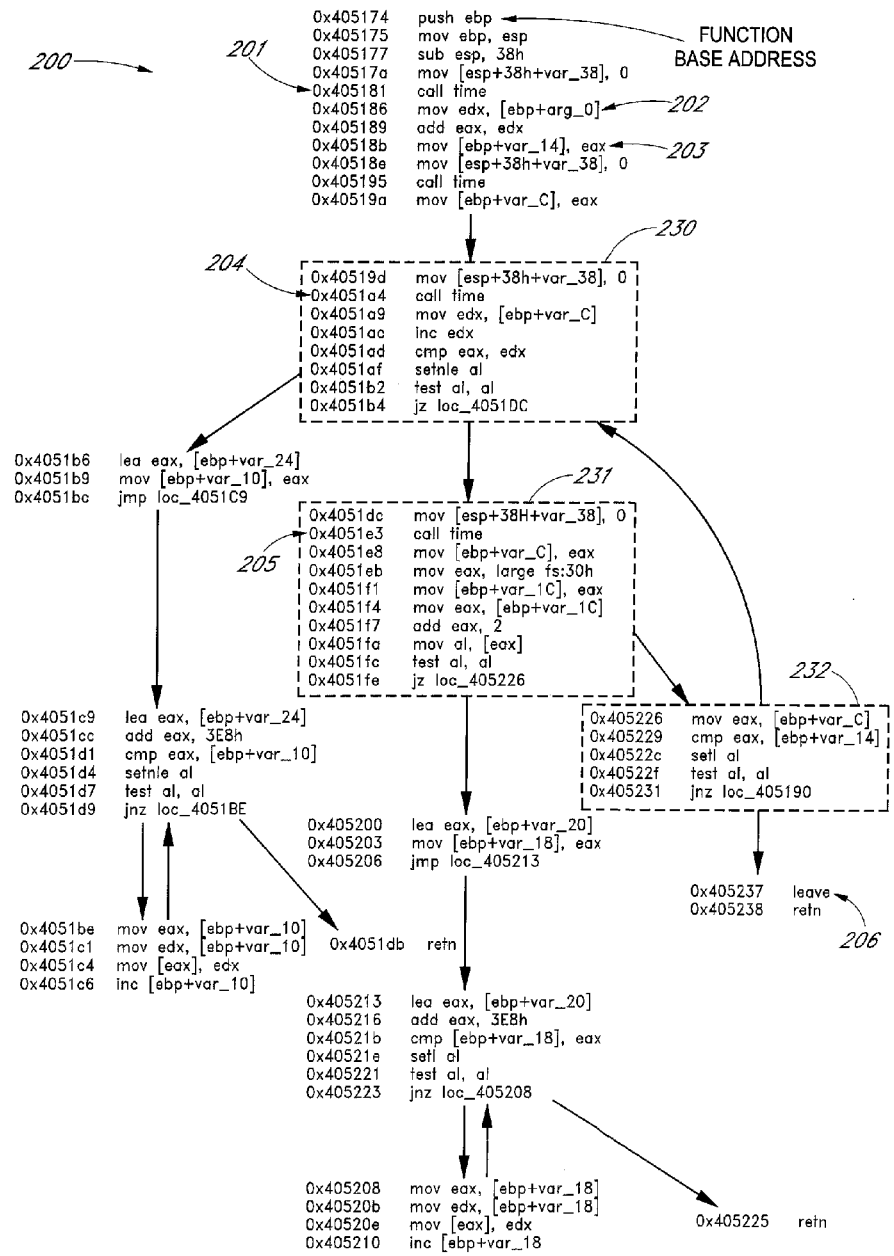
FIG. 2 shows a control flow graph of an example function with stalling code.

FIG. 2 shows a control flow graph (CFG) 200 of an example function with stalling code. The function of FIG. 2 is written for the x86 architecture. Generally speaking, a control flow graph organizes all the instructions of a single function into several independent basic blocks. In a control flow graph, the control flow transitions, such as jump and conditional jump instructions, are modeled as edges among the blocks. The control flow graph shows the paths that might be traversed through a program during its execution.

In the control flow graph 200 of FIG. 2, the code blocks 230, 231, and 232 are organized as a loop of a function that begins at address 0x405174 (FIG. 2, Function Base Address). The code blocks 230-232 perform time checking operations by invocating the time( ) function at least twice, at addresses 0x4051a4 (at arrow 204) and 0x4051e3 (at arrow 205). In the example of FIG. 2, the malware defines a timeout of 600 seconds by calling the time( ) function (at arrow 201), setting the value of the EDX register to 600 (at arrow 202), and setting the time out as 600 by the instruction at the address 0x40518b (at arrow 203). In each iteration of the looping code blocks 230-232, the invocation of the time( ) function (at arrow 205) gives the elapsed time since the first iteration. The code block 232 checks whether or not the elapsed time has exceeded 600 seconds. Another loop iteration will be performed while the elapsed time has not exceeded 600 seconds. When the elapsed time has exceeded 600 seconds, the following code at address 0x405237 (at arrow 206) will be executed. The time of 600 seconds is too long for most sandbox analysis procedures, causing the sandbox to timeout, thus failing to detect the malicious behavior of the malware.

Figure 3:
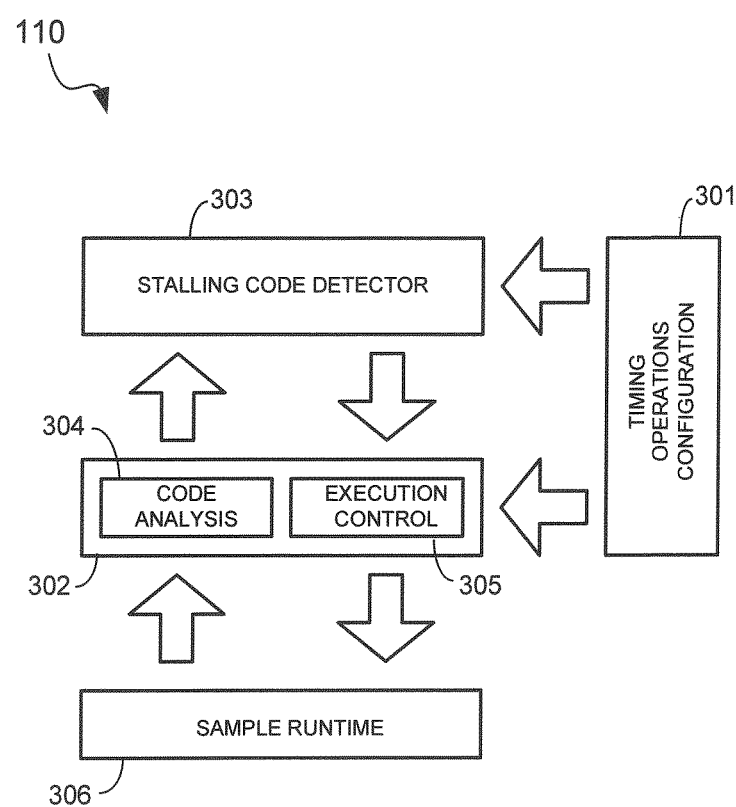
FIG. 3 shows a logical diagram of a stalling code detection section of an anti-malware program in accordance with an embodiment of the present invention.

FIG. 3 shows a logical diagram of a stalling code detection section of the anti-malware program 110 in accordance with an embodiment of the present invention. In the example of FIG. 3, the anti-malware program 110 comprises the following modules: a timing operations configuration 301, an analysis platform 302, and a stalling code detector 303. The anti-malware program 110 may include other modules for detecting malware in general, but those modules are not shown in FIG. 3 for clarity of illustration. In the example of FIG. 3, a sample program being evaluated for malware is analyzed during runtime (see 306). The sample program is also simply referred to herein as the "sample", and the binary code of the sample program is also simply referred to herein as the "sample binary."

The timing operations configuration 301 may comprise a configuration file that identifies timing operations that are likely to be included in a stalling code. The timing operations defined in the configuration 301 may include time-related functions, application programming interfaces (APIs), procedures, and time-related instructions. On the MICROSOFT WINDOWS operating system, the time-related operations may include time( ), Sleep( ), GetTickCount( ), WaitForSingleObject( ), and GetLocalTime( ). On the x86/x64 architecture, the time-related operations may include the RDTSC (read time stamp counter) instruction.

In the example of FIG. 3, the analysis platform 302 comprises a code analysis module 304 and an execution control module 305. The analysis platform 302 may be implemented using a suitable disassembler and a debugger or a dynamic instrumentation tool, such as the PIN or the DynamoRIO dynamic binary instrumentation tool. In one embodiment, the code analysis module 304 performs disassembly, intra-function, and inter-function analysis. More specifically, the code analysis module 304 may be configured to disassemble the sample binary. The disassembly process translates the sample binary into assembly code, which is used by the code analysis module 304 to construct a control flow graph of the sample. The code analysis module 304 may represent the control flow graph in data format, as opposed to pictorially. The control flow graph allows the code analysis modules 304 to identify one or more loops of the sample. In the construction of the control flow graph, the global relationships among all sub functions in the sample binary may be identified during inter-function analysis and the relationships in each individual function may be identified during intra-function analysis. The code analysis module 304 may employ any suitable algorithm in constructing the control flow graph and identifying loops in the control flow graph, including algorithms described in the book "Modern Compiler Implementation in C" by Andrew W. Apple.

In one embodiment, the execution control module 305 is configured to set breakpoints and to monitor and modify the process context of the sample during execution. In one embodiment, the execution control module 305 operates similarly to a debugger. The execution control module 305 may set breakpoints in the image space of the sample binary to allow stalling code detection and execution flow correction. The execution control module 305 allows the context during runtime of the sample, registers, and stack and memory values to be monitored and modified, if necessary, in order to alter the program execution flow. The execution control module 305 may read the timing operations configuration 301 to identify the time-related operations typically employed in stalling codes, and set breakpoints on those time-related operations that appear in the sample.

In one embodiment, the stalling code detector 303 is configured to identify loop blocks in the sample program, to determine if any of the identified loop blocks is a stalling code block, and to patch the sample program to change execution flow and exit out of a stalling code block. When a breakpoint is triggered, the stalling detector 303 analyzes the instructions being executed and the context at that moment using information from the control flow graph and the context to identify a loop and timing operations embedded in the loop. When the stalling code detector 303 finds a stalling code block, the stalling code detector 303 may modify the context to break the program execution flow in the current loop. Otherwise, the stalling code detector 303 may allow the program execution flow to continue without intervention.

Figure 4:
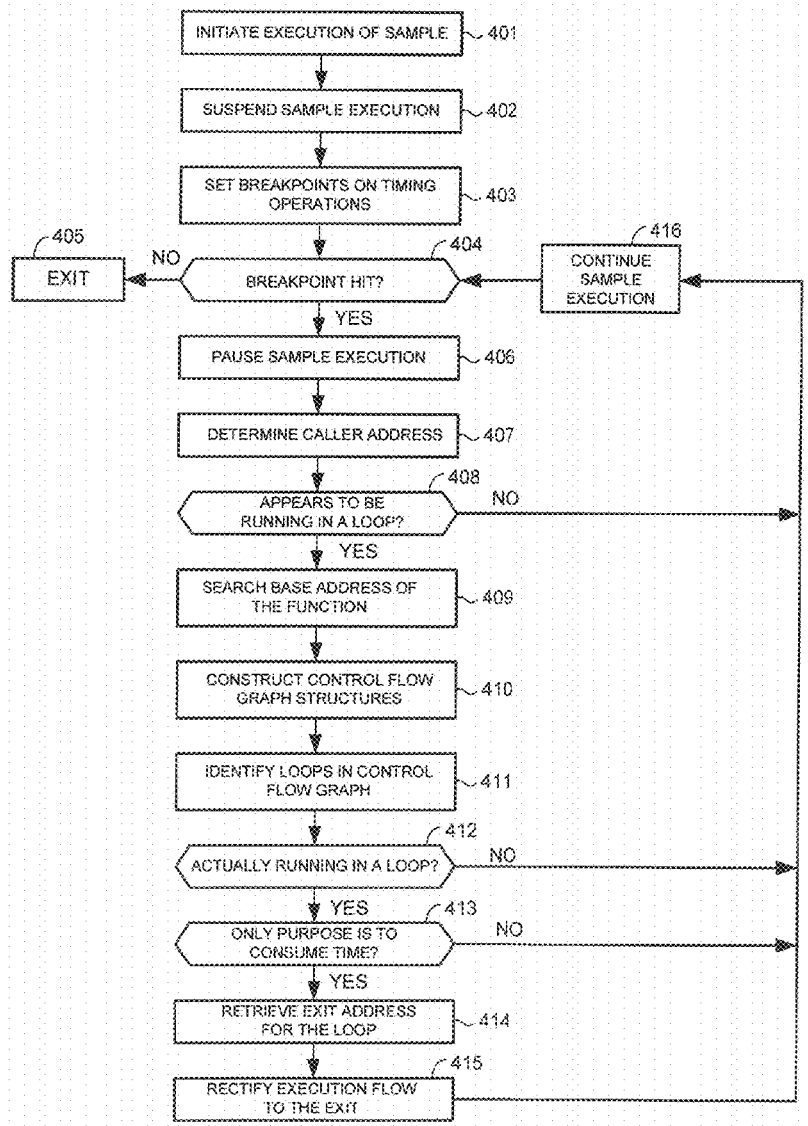
FIG. 4 shows a flow diagram of a method of identifying stalling code in accordance with an embodiment of the present invention.

FIG. 4 shows a flow diagram of a method of identifying stalling code in accordance with an embodiment of the present invention. The method of FIG. 4 may be performed by an anti-malware program with components shown in FIG. 3. Other components may also be employed without detracting from the merits of the present invention.

In the example of FIG. 4, execution of a sample being evaluated for malware is initiated (step 401). The execution of the sample may be initiated by starting the sample process, i.e., the process of the sample in main memory, or by attaching the sample process on an existing process. The execution of the sample may be paused and suspended at the very moment when the sample process is started or attached (step 402). Breakpoints are set on timing operations (step 403), such as those indicated in a timing operations configuration file, for example. When a breakpoint is not hit after a predetermined time, the sample may be deemed to be free of stalling code and the stalling code detection process is exited (step 404 to step 405). The amount of time to wait for a breakpoint to be hit may vary depending on the particulars of the anti-malware program.

When a breakpoint that was set in the previous step (e.g., at step 403) is hit, the sample is paused and suspended again (step 404 to step 406). The address of the timing operation where the breakpoint is hit, which is also referred to herein as the "caller address," is determined (step 407). The caller address may be determined from the execution trace of the sample, for example.

A heuristic technique may be employed to determine if the sample appears, i.e., likely but not confirmed, to be running in a loop (step 408). More particularly, the sample may be observed to determine if the sample behaves in a manner indicative of looping through the same set of instructions. For example, records of all previously identified caller addresses may be kept to determine if the same caller addresses are repeatedly found consecutively. If so, the sample is likely to be executing in a loop.

When the sample is deemed likely to be executing in a loop, a more thorough stalling code detection process is initiated by searching for the base address of the function that includes the calls to the timing operations where breakpoints are hit (step 408 to step 409). The base address of the function may be found by searching in the previous image space. Control flow graph structures of the function are constructed (step 410) to identify one or more loops in the function (step 411). Loops may be identified by finding a back edge of the control flow graph, for example. A back edge is not only an edge, but also represents the control flow transferred from the current to the previously executed basic block. A back edge indicates both the head and tail blocks of the loop. The rest of the loop may also be retrieved with information provided from a back edge.

The current execution of the sample may be checked to confirm the sample is executing in a loop (step 412). For example, the value of the program counter register in the scope of all basic blocks in loop may be inspected to confirm the sample is currently executing in a loop. To further confirm that the loop execution is caused by stalling code, the loop may be evaluated to determine if it performs a useful function besides simply consuming time (step 412 to step 413). For example, the loop may be evaluated to determine if it calls particular application programming interfaces that are known to be meaningful (indicating that the loop is not a stalling code block). Loops that only perform timing checks or timing calculations are likely to be stalling code blocks. The confirmation may be performed deeply and recursively if internal functions are called. Generally speaking, stalling codes include common instructions for performing loops. However, polling operations in some programs should be distinguished, such as API's for checking system status, including file status, network status, and so on. If these querying API functions are invoked in a loop, the loop is not likely to be a stalling code block. These APIs that are considered meaningful and not indicative of stalling code may be indicated in the timing operations configuration.

The sample may be deemed to contain stalling code blocks when the sample is deemed to be actually running in a loop that has no other purpose except to consume time (step 412 to step 413 to step 414). Examples of loops that only consume time include those that only check time, perform time comparisons, calculates time, and mark time. When the loop only consumes time and perform no other purpose, the exit address of the loop may be retrieved (step 414) to allow the execution flow of the sample to be rectified to the exit (step 415). More specifically, when a loop is identified to comprise stalling code, the execution flow may be directed to the exit of the loop, which may be determined at the time the loop is identified. The program counter register may be patched with the exit address of the loop to alter the execution flow. This allows execution to be started at the address of the next instruction, just outside of the stalling code block.

When the sample does not appear to be running in a loop (step 408 to step 416), is not actually running in a loop (step 412 to step 416), or is not only consuming time (step 413 to step 416), the execution of the sample continues until completion or until another breakpoint is hit to trigger another round of stalling code detection analysis. As can be appreciated, the method of FIG. 4 allows the sample to be executed without getting stuck or wasting time in a stalling code block, thereby allowing the sample to be evaluated for malware.

Figure 5:
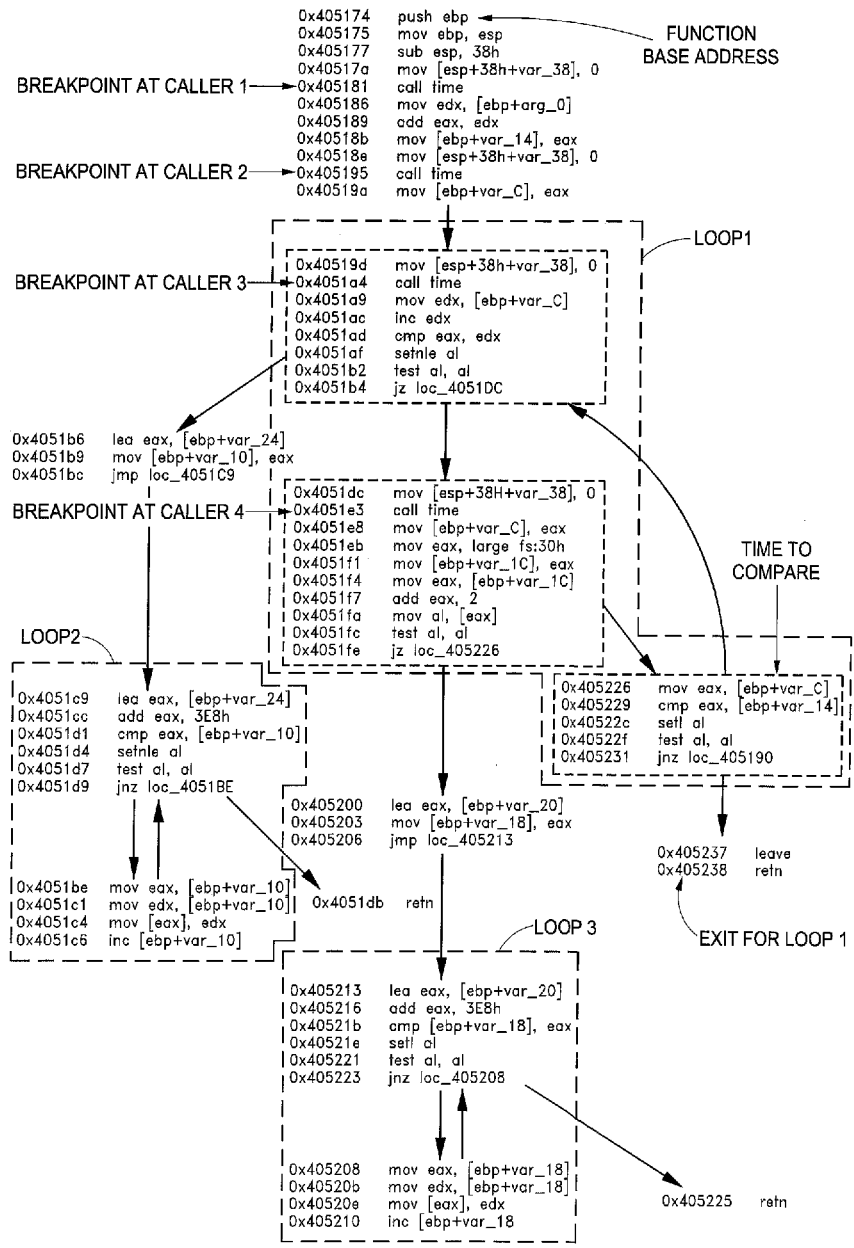
FIG. 5 illustrates how the function of FIG. 2 may be evaluated for stalling code using the method of FIG. 4.

FIG. 5 illustrates how the function of FIG. 2 may be evaluated for stalling code using the method of FIG. 4. In the example of FIG. 5, breakpoints are set at the timing operation "time( )" in msvcrt.dll. The caller addresses at the breakpoints are found to be at the addresses 0x405181 (FIG. 5, Breakpoint at Caller 1), 0x405195 (FIG. 5, Breakpoint at Caller 2), 0x4051a4 (FIG. 5, Breakpoint at Caller 3), and 0x4051e3 (FIG. 5, Breakpoint at Caller 4). After running for a while, sample execution pauses upon hitting the breakpoint at the address 0x4051a4 at least a second time. The timing operations at addresses 0x4051a4 and 0x4051e3 are found to be executed repeatedly, indicating that the sample appears to be executing in a loop. The base address of the current function is identified to be 0x405174 (FIG. 5, Function Base Address). The control flow graph of the function indicates three loops (FIG. 5, Loop 1, Loop 2, and Loop 3), with one of the loops (FIG. 5, Loop 1) having stalling code blocks at addresses 0x40519d-0x4051b4, 0x4051dc-0x4051fe, and 0x405226-0x405231. The current program counter, in the EIP register, is found to be pointed in the first loop (FIG. 5, Loop 1) at the address 0x4051a4 (FIG. 5, Breakpoint at Caller 3). The first loop is only performing timing operations and is thus deemed to comprise stalling code. The exit for the first loop is located at the address 0x405237 (FIG. 5, Exit for Loop 1). To rectify the execution flow and exit the first loop, the EIP register, which currently has the address 0x4015a4, is modified to have the exit address of the first loop (i.e., address 0x405237). This allows the sample to exit the first loop and continue execution starting from the address 0x405237.

Figure 6:
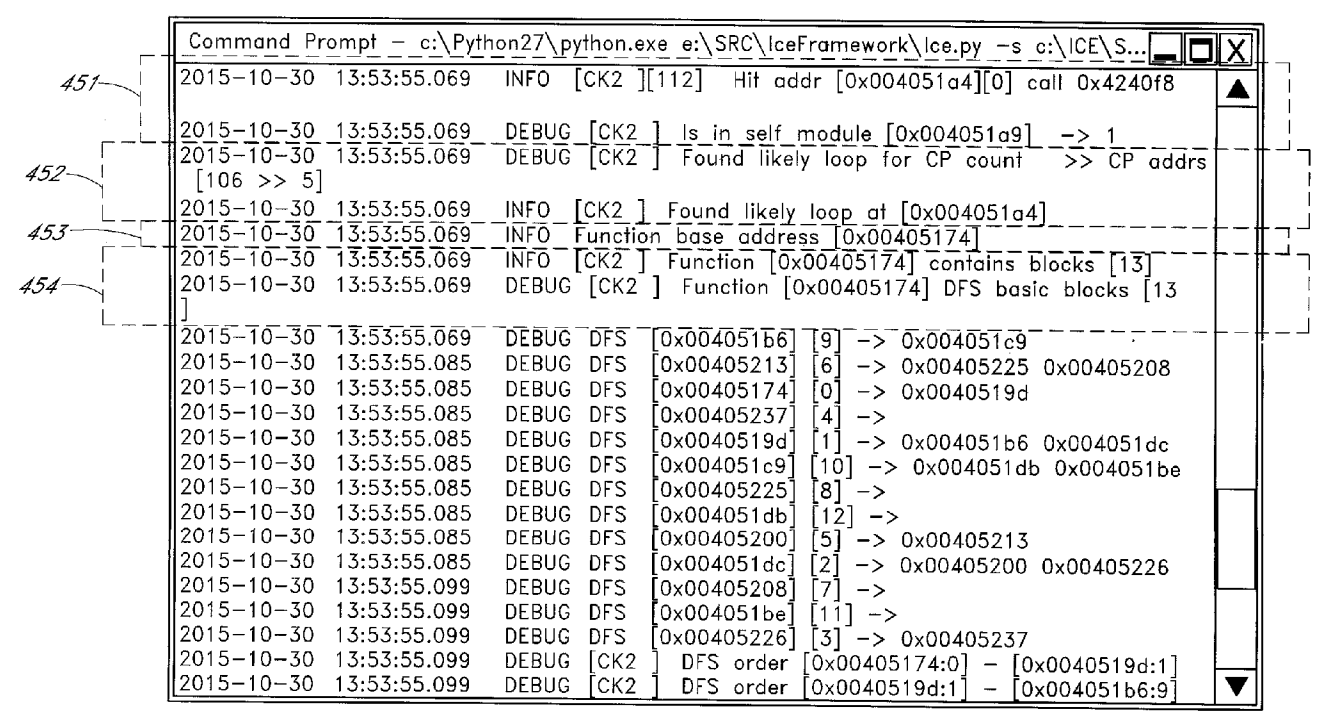
Figure 7:
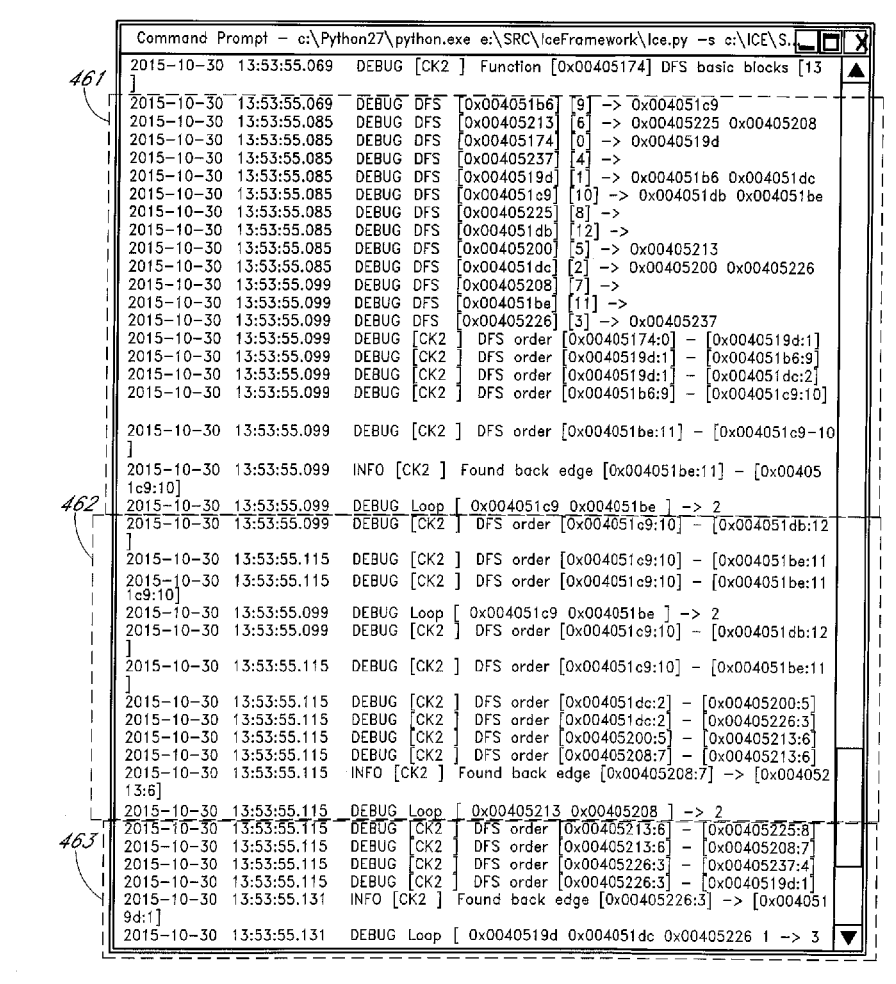

FIGS. 6-8 show example screen shots of the anti-malware program 110 evaluating the function of FIG. 2 for stalling code in accordance with an embodiment of the present invention. In FIG. 6, a breakpoint is hit at the address 0x004051a4 (FIG. 6, 451; see also FIG. 5, Breakpoint at caller 3). The sample appears to be running in a loop (FIG. 6, 452). The base address of the function of the sample that appears to be running in a loop was found to be at 0x00405174 (FIG. 6, 453; see also FIG. 5, Function Base Address). A control flow graph of the function is constructed (FIG. 6, 454).

Continuing in FIG. 7, the first loop of the function is found at the addresses 0x0040591d, 0x004051dc, and 0x00405226 (FIG. 7, 463; see also FIG. 5, Loop 1), the second loop of the function is found at the addresses 0x00405c9 and 0x004051be (FIG. 7, 461; see also FIG. 5, Loop 2), and the third loop of the function is found at the addresses 0x00405213 and 0x00405208 (FIG. 7, 462; see also FIG. 5, Loop 3). Continuing in FIG. 8, the sample is found to be actually running in a loop (FIG. 8, 471) and has no other purpose but to consume time (FIG. 8, 472). The stalling code is exited by setting the program counter to the exit address of the first loop at 0x00405237 (FIG. 8, 473; see also FIG. 5, Exit for Loop 1).

Methods and systems for detecting stalling code have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of detecting stalling code, the method comprising:
   defining a plurality of timing operations that are employed in known stalling codes;
   executing a sample program to evaluate the sample program for malware;
   suspending execution of the sample program after executing the sample program;
   while execution of the sample program is suspended, setting a breakpoint on a timing operation among the plurality of timing operations in the sample program;
   resuming execution of the sample program after setting the breakpoint;
   in response to hitting the breakpoint, determining if the sample program comprises stalling code that performs time consuming operations in a loop; and
   in response to determining that the sample program comprises stalling code, exiting the loop.

2. The computer-implemented method of claim 1, further comprising:
   determining a caller address of the timing operation.

3. The computer-implemented method of claim 1, wherein exiting the loop comprises:
   retrieving an exit address of the loop; and setting a program counter register to the exit address of the loop.

4. The computer-implemented method of claim 1, further comprising:
   stopping execution of the sample program when no breakpoint is hit after a predetermined amount of time.

5. The computer-implemented method of claim 1, further comprising:
   determining a base address of a function that includes the loop; and
   constructing a control flow graph of the function.

6. The computer-implemented method of claim 5, further comprising:
   identifying the loop in the control flow graph.

7. A system for detecting stalling code, the system comprising memory and a processor, the memory containing instructions that when executed by the processor of the system causes the system to
   execute a sample program to evaluate the sample program for malware, suspend execution of the sample program after executing the sample program, set a breakpoint on a timing operation among a plurality of predefined timing operations that are employed in known stalling codes in the sample program while execution of the sample program is suspended, resume execution of the sample program after setting the breakpoint, determine if the sample program comprises stalling code that performs time consuming operations in a loop in response to hitting the breakpoint, and exit the loop in response to determining that the sample program comprises stalling code that performs time consuming operations in the loop.

8. The system of claim 7, wherein the processor executing the instructions causes the system to store a configuration file that defines the plurality of timing operations that are employed in known stalling codes.

9. The system of claim 7, wherein the processor executing the instructions causes the system to determine a caller address of the timing operation.

10. The system of claim 7, wherein the processor executing the instructions causes the system to patch a program counter to exit the loop by retrieving an exit address of the loop and setting the program counter to the exit address of the loop.

11. The system of claim 7, wherein the processor executing the instructions causes the system to stop execution of the sample program when no breakpoint is hit after a predetermined amount of time.

12. The system of claim 7, wherein the processor executing the instructions causes the system to determine a base address of a function that includes the loop and construct a control flow graph of the function.

13. The system of claim 12, wherein the processor executing the instructions causes the system to identify the loop from the control flow graph.

* * * * *